United States Patent [19]

Nakayama

[11] Patent Number: 4,851,992

[45] Date of Patent: Jul. 25, 1989

[54] REGISTER/SAVING/RESTORING SYSTEM FOR SAVING AND RESTORING DATA IN A REGISTER OF A SLAVE PROCESSOR

[75] Inventor: Takashi Nakayama, Tokyo, Japan

[73] Assignee: NEC Corporation, Tokyo, Japan

[21] Appl. No.: 29,569

[22] Filed: Mar. 24, 1987

[30] Foreign Application Priority Data

Mar. 24, 1986 [JP] Japan .................................. 61-66508

[51] Int. Cl.$^4$ ...................... G06F 15/16; G06F 13/00; G06F 9/00
[52] U.S. Cl. ................................. 364/200; 364/228.3; 364/267.0; 364/230.4; 364/968 A
[58] Field of Search ... 364/200 MS File, 900 MS File

[56] References Cited

U.S. PATENT DOCUMENTS

| | | | |
|---|---|---|---|
| 3,643,227 | 2/1972 | Smith et al. | 364/200 |
| 4,096,564 | 6/1978 | Inose et al. | 364/200 |
| 4,333,144 | 6/1982 | Whiteside et al. | 364/200 |
| 4,394,730 | 7/1983 | Suzuki et al. | 364/200 |
| 4,414,624 | 11/1983 | Summer, Jr. et al. | 364/200 |
| 4,430,707 | 2/1984 | Kim | 364/200 |
| 4,685,125 | 8/1987 | Zave | 379/96 |
| 4,736,318 | 4/1988 | Delyani et al. | 364/200 |

Primary Examiner—David Y. Eng
Assistant Examiner—Ayni Mohamed
Attorney, Agent, or Firm—Foley & Lardner, Schwartz, Jeffery, Schwaab, Mack, Blumenthal & Evans

[57] ABSTRACT

A register saving/restoring system for use in a data processing system is constructed of a CPU and at least one slave processors. The registers of the slave processors are not saved nor restored when the CPU switches tasks, however the descriptor of the task carried out in one slave processor most recently and the descriptor of a task being executed by the CPU are compared so that the slave processor registers are saved and restored. This process is done only if the descriptors are different, in order to avoid the waste register saving/restoring processing.

6 Claims, 7 Drawing Sheets

REGISTER/SAVING/RESTORING SYSTEM FOR SAVING AND RESTORING DATA IN A REGISTER OF A SLAVE PROCESSOR

BACKGROUND OF THE INVENTION

1. Field of the Invention

The present invention relates to an additional processing unit (which will be called a "slave processor" hereinafter) coupled to a microprocessor and, more particularly, to a register saving/restoring system for saving and restoring data in a register provided in the slave processor into and out of a main memory unit when tasks are switched.

2. Description of the Prior Art

The microprocessor is frequently composed of a plurality of chips when attempts are made to extend its function, because all the functions cannot be integrated into a single chip.

Since each chip has its pin number limited, a microprocessor system is currently constructed by coupling a chip for a central processing system (which will be abbreviated into "CPU") and one or more chips for slave processors through a local bus.

The CPU itself has a function of the microprocessor. But, the function can be easily extended and the operation can be executed at a high speed by coupling the CPU with one or more slave processors and causing these processors to execute the extended commands of the CPU.

One microprocessor according to the prior art is shown in FIG. 1. A CPU 109, eight slave processors 101 to 108 and a main memory unit 140 are coupled through a local bus 130 to construct altogether a microprocessor 100. The CPU 109 contains at least one register 119, and each of the slave processors 101 to 108 contains at least one register 111 to 118.

Commands for the microprocessor 100 are classified into nine sets: one set to be executed by the CPU 109 and eight sets to be executed by the slave processors 101 to 108. The set of commands to be executed by the CPU 109 uses the register 119 in the CPU 109 but not the registers 111 to 118 in the slave processors 101 to 108. On the contrary, the set of commands to be executed by the slave processor 101 uses both the register 111 in the slave processor 101 and the register 119 in the CPU 109 but not the registers 112 to 118 in the remaining slave processors 102 to 108. This usage also applies to the slave processors 102 to 108.

In case there are several tasks to be executed by the CPU, generally speaking, they are executed in independent environments. Therefore, when the tasks themselves are to be switched, it is necessary to switch the environments of the tasks. The major task environments are registers belonging to a microprocessor. In the microprocessor 100 of the prior art shown in FIG. 1, the registers 119 and 111 to 118 can create the task environments. The switching of these task environments is conducted by saving the content of a register or the environment of a previous task in a register save area which is prepared for each task on the main memory unit 140 and by restoring the once saved register content into the registers 119 and 111 to 118 out of the register save area of the next task to be switched.

FIG. 2 shows the case in which tasks A, B and C are to be asynchronously switched. All the programs of the tasks A, B and C contain the commands to the CPU 109 and the slave processors 111 to 118. At the instants of task switchings 201, 202 and 203, therefore, the register saving/restoring processes are conducted for the registers 111 to 118.

The microprocessor of the prior art described above and constructed of the CPU and one or more slave processors is accompanied by the following defect: Although the programs of individual tasks contain commands to the slave processors, even the registers of the slave processors unused in the task switching are subjected to the saving/restoring processes, too, in case the slave processors are not used in a segment continuing from a current task switching to a subsequent task switching. This defect becomes more serious for a greater number of slave processors coupled to the CPU and each containing a register therein, so that the time period needed for the task switching becomes the longer.

In the example of FIG. 2, a waste register saving/restoring processing is presented in the following:

(1) Since nothing but the slave processor 101 is used in a segment 212, the register saving/restoring process may be required for the slave processor 101 only. At the task switching 201, however, the registers of the slave processors 102 to 108 are also saved and restored.

(2) In a segment 213, none of the slave processors 101 to 108 are used. At the task switchings 202 and 203, the registers of the slave processors 101 to 108 are also saved and restored.

(3) Although the slave processor 102 is left unused in the segments 212 and 213, its register is also unnecessarily saved and restored at the task switchings 201, 202 and 203.

The register saving/restoring processings thus conducted unnecessarily are caused by the fact that they are conducted at any task switching for all the slave processors that may possibly be used for a subsequent task.

SUMMARY OF THE INVENTION

It is, therefore, an object of the present invention to solve the problem of the prior art thus far described and to provide a register saving/restoring system which can avoid the waste register saving/restoring processing.

According to an aspect of the present invention, there is provided a slave processor register saving/restoring system for a processor system having a CPU and one or more slave processors, comprising: a first unit for storing the descriptor of the last task having been executed in each of the slave processors; a second unit for comparing the content of the descriptor of a current task being executed by a CPU with the content of the first means; and a third unit for switching, if the comparison results in inconsistency, the task environment of a target one of the slave processors immediately before the target slave processor is used.

According to another, but major feature of the present invention, more specifically, there is provided:

in a data processing system which comprises a central processing unit; one or more additional processing units each including at least one register resource for extending the function of the central processing unit; and a main memory unit having a register save area, a register saving/restoring system comprising:

a first unit for storing the descriptor of a task being executed by central processing unit;

a second unit for storing the descriptor of a task to be executed by one of the additional processing units; and a third unit for judging whether or not the contents of the first unit and the second unit are consistent, wherein the central processing unit defers the execution of a command to each of the additional processing units by causing the third unit to conduct the judgement such that, if the judgement reveals an inconsistency, it saves the content of the register resource of the additional processing unit into the register save area of the main memory unit and restores the environment of a task indicated by the first unit out of the register save area of the main memory unit into the register resource of a corresponding one of the additional processing units before it executes the command, and, if the judgement reveals a consistency, it executes the command immediately without saving the register resources of the additional processing units.

According to another major feature of the present invention, there is provided:

in a data processing system comprising: a central processing unit; one or more additional processing units each including at least one register resource for extending the function of the central processing unit; and a main memory unit having a register save area, a register saving/restoring process comprising the steps of:

storing the descriptor of a task being executed by the central processing unit;

storing the descriptor of a task to be executed by one of the additional processing units;

judging whether or not the contents of the executed task and the task to be executed are consistent;

if the judgement reveals an inconsistency, saving the content of the register resource of each of the additional processing units into the register save area of the main memory unit, restoring the environment of the task to be executed out of the register save area of the main memory unit into the register resource of a corresponding one of the additional processing units, and executing a command to the corresponding additional processing unit; and if the judgement reveals a consistency, executing the command immediately without saving the register resources of the additional processing units.

As has been described above, according to the present invention, in a data processing system constructed of a CPU and one or more slave processors, the registers of the slave processors are neither saved nor restored when the CPU switches tasks, but the descriptor of the task having used one slave processor the most recently and the descriptor of a task being executed by the CPU are compared so that the slave processor registers are saved and restored, only if the descriptors are different, to avoid the waste register saving/restoring processing.

As a result, the data processing system incorporating the register saving/restoring system of the present invention can operate at a high speed.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

The present invention will be described in the following with reference to the accompanying drawings.

Figure 3:
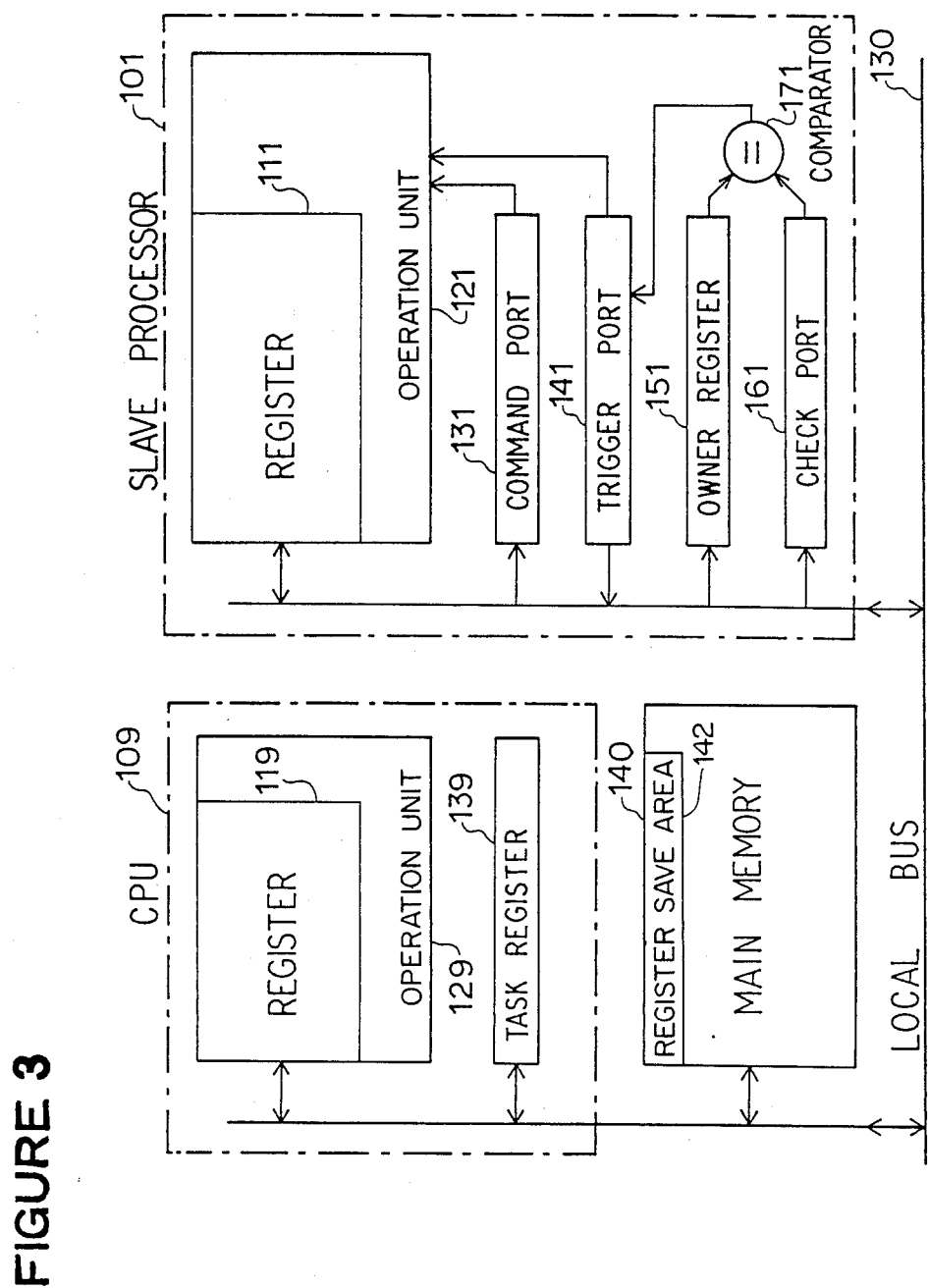
FIG. 3 is a block diagram showing one embodiment of the present invention.

FIG. 3 shows a data processing system having a register saving/restoring (storing/loading) system according to one embodiment of the present invention. The microprocessor shown in FIG. 3 is constructed by coupling a CPU 109, a main memory unit 140 and a plurality of, for example, eight slave processors (but only one slave processor 101 is shown and the remaining slave processors are not shown) through a local bus 130.

The CPU 109 is composed of an operation unit 129 which includes at least one register 119, and the slave processor 101 is composed of an operation unit 121 which includes at least one register 111. A task register 139 built in the CPU 109 is used to store the descriptor of a task being executed by the CPU 109, and an owner register 151 built in the slave processor 101 is used to store the descriptor of a task having lastly used the slave processor 101. Other components of the slave processor 101 are a check port 161 for copying the content of the task register 139, a comparator 171 for detecting the coincidence between the contents of the owner register 151 and the check port 161, a command port 131 for receiving a command to be executed by the slave processor 101 from the local bus 130 and addressing it, and a trigger port 141 for beginning the execution of a command addressed by the command port 131.

Although omitted from FIG. 3, each of the remaining seven slave processors (not shown) is also composed of an operation unit having an internal register, a command port, a trigger port, an owner register, a check port, and a comparator, respectively, similarly to the slave processor 101. In the following description, the remaining seven slave processors are indicated by Reference Numerals 102 to 108, and their associated command ports, trigger ports, the owner registers and the check ports and the comparators are designated by Reference Numerals 132-138, 142-148, 152-158, 162-168 and 172-178, respectively.

The register saving/restoring (storing/loading) system of the present invention will be described in the following with reference to FIGS. 4A, 4B and 4C.

Figure 4A:
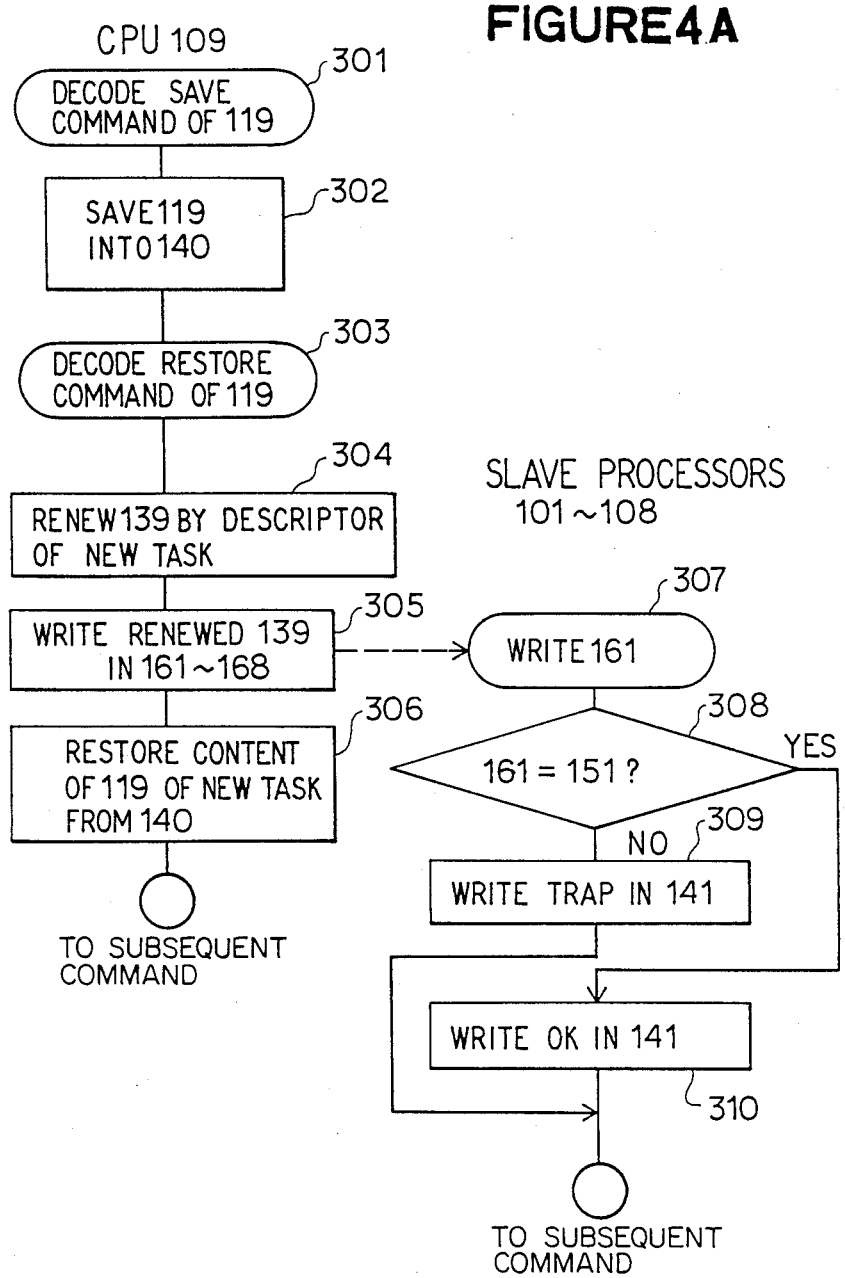
FIGS. 4A, 4B and 4C are flow charts showing the register saving/restoring processing of the embodiment of the present invention.

FIG. 4A shows the operations of the CPU 109 and the slave processors 101 to 108 when the CPU 109 switches tasks. When the CPU 109 decodes (at a step 301) its register save command, it saves (or stores) (at a step 302) the content of its register 119 in a register save area 142 of the main memory unit 140 through the local bus 130.

Next, when the CPU 109 decodes (at a step 303) its register restore command, it renews (at a step 304) its task register 139 by the descriptor of a new task designated by the command 303. Then, the CPU 109 writes (at a step 305) the renewed content of the task register 139 simultaneously in the check ports 161 to 168 of all the slave processors 101 to 108 through the local bus 130, and (at a step 306) restores (or loads) the register content out of the register save area 142 of the main memory unit 140 for a new task into the register 119 through the local bus 130.

When the check port 161 is written (at a step 307), the slave processor 101 uses its comparator 171 to compare (at a step 308) the contents of the check port 161 and the owner register 151. If NO (that is, if the contents are different), the slave processor 101 writes (at a step 309) "TRAP" (i.e., the content indicating that the current task being executed by the CPU 109 and the last task having lastly used the slave processor 109 are different) in the trigger port 141. If YES, the slave processor 101 writes (at a step 310) "OK" in the trigger port 141. The aforementioned processings on the slave processor 101 are simultaneously executed on the remaining slave processors 102 to 108. By the processings described above, the task environment of the CPU 109 has been switched to a new task, but the task environments of the slave processors 101 to 108 have not been switched yet.

Figure 4B:
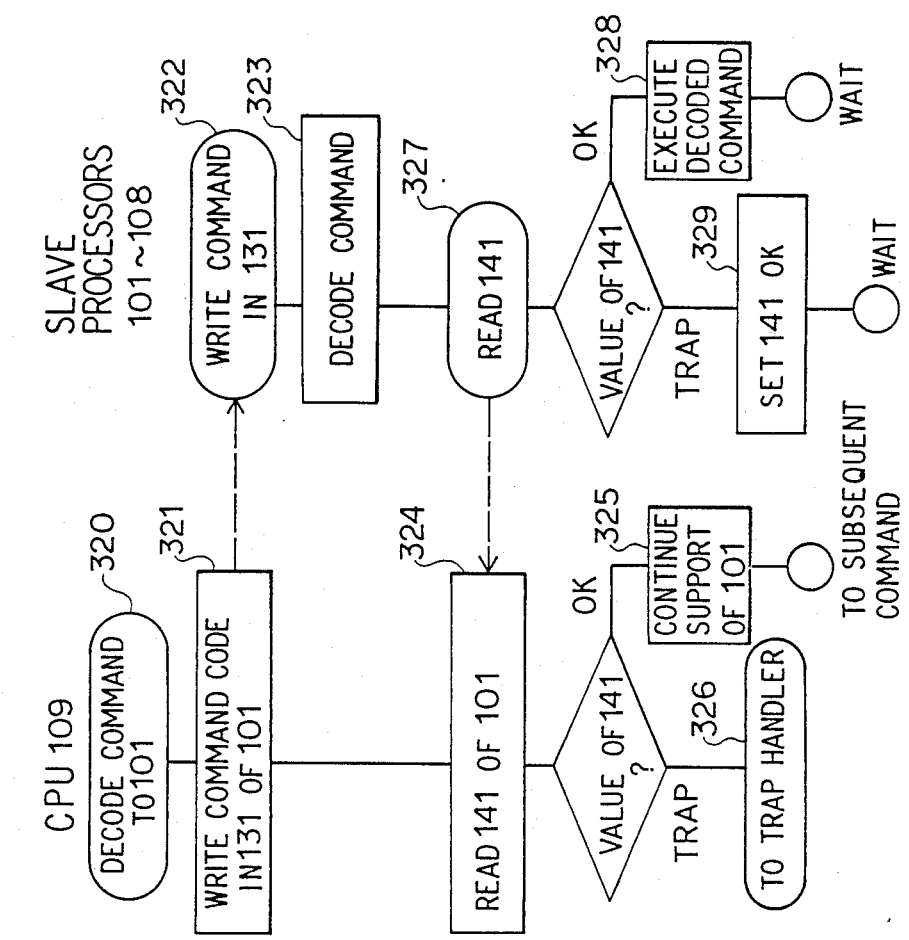

FIG. 4B shows how a command to the slave processor 101 is executed by the CPU 109 and the slave processor 101. When the CPU 109 decodes (at a step 320) the command to the slave processor 101, it writes (at a step 321) the command code in its command port 131 through the local bus 130. The slave processor 101 writes (at a step 322) the command in the command port 131 and decodes (at a step 323) the written command but does not execute it. Next, the CPU 109 reads (at a step 324) the content of the trigger port 141. If the content is "OK", the CPU continue (at a step 325) the support of the slave processor 101. If the content is "TRAP", on the contrary, the CPU 109 interrupts the command to the slave processor 101 to shift (at a step 326) the control to a trap handler.

Meanwhile, the slave processor 101 reads (at a step 327) the content of the trigger port 141. If this content is "OK", the slave processor 101 executes (at a step 328) the decoded command. If the content is "TRAP", on the contrary, the slave processor 101 interrupts (at a step 329) the execution of the command while setting the content of the trigger port 141 at "OK".

In summary, a command to a slave processor can be executed if a current task being executed by the CPU and a last task having lastly used the slave processor are identical (i.e., the trigger port ="OK"). Otherwise, (i.e., the trigger port ="TRAP"), it is necessary to switch the task environment of the slave processor.

Figure 4C:
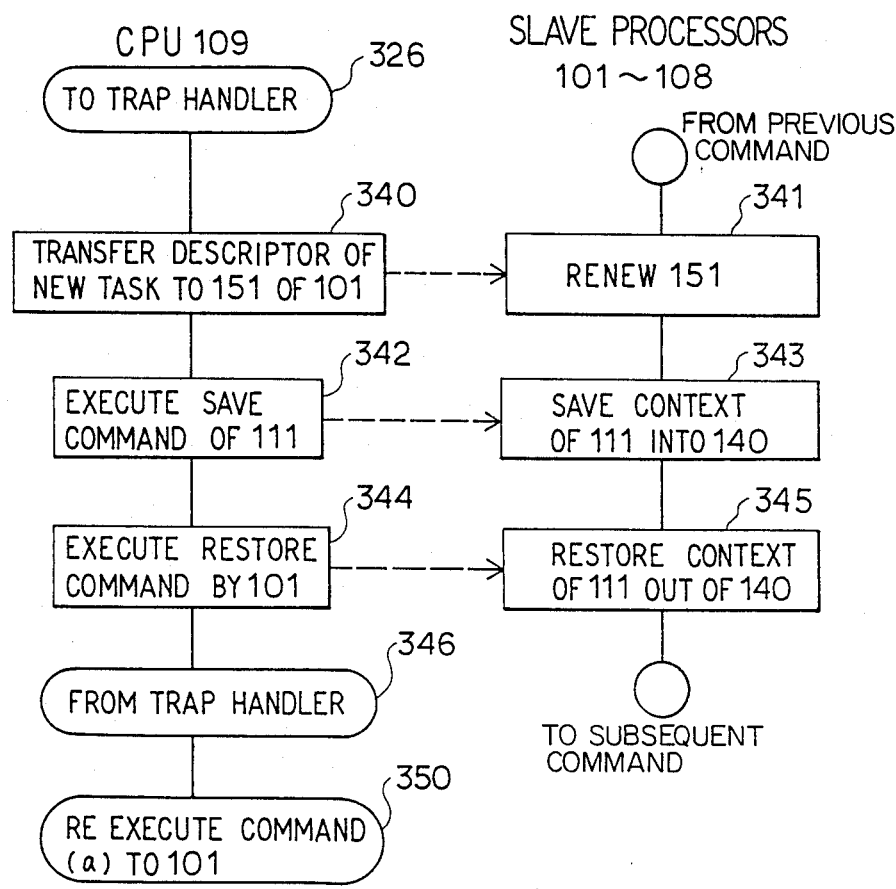

FIG. 4C shows the task environment switching operations of the slave processor 101. At first, the CPU 109 having its control shifted (at the step 326) to the trap handler, transfers (at a step 340) the content of the task register 139, i.e., the descriptor of the current task (i.e., a CPU task renewed (at a step 341) by the slave processor 101) being executed by the CPU 109 to the owner register 151 of the slave processor 101 through the local bus 130.

Next, the CPU 109 causes the slave processor 101 to execute (at a step 342) the register save command and transfers (at a step 343) the content of the register 111 to the register save area 142 of the main memory unit 140. Then, the CPU 109 causes the slave processor 101 to execute (at a step 344) the register restore command and restores (at a step 345) the content of the register 111 out of the register save area for the new task. After this execution, the CPU 109 returns (at a step 346) its control from the trap handler. Both the CPU 109 thus having ended the saving/restoring processing of the register 111 of the slave processor 101 and this slave processor 101 re-execute (at a step 350) the command (of the step 320) to the slave processor 101 in which TRAP has occurred in its trigger port 141.

Figure 1:
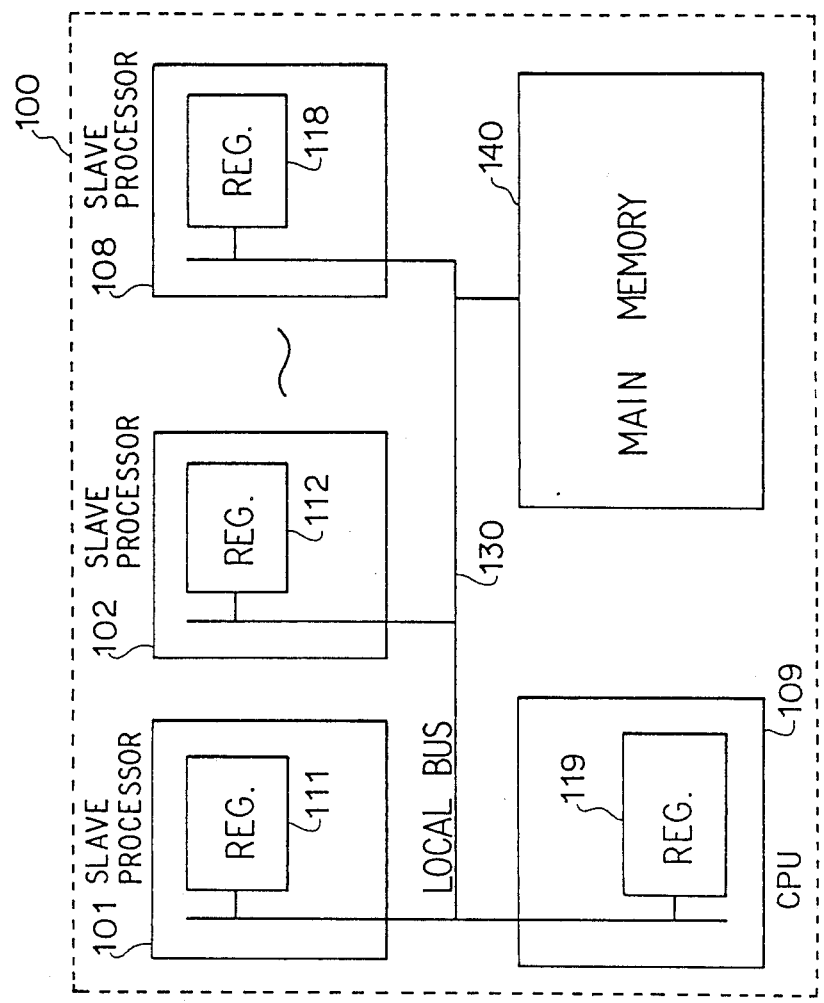
FIG. 1 is a block diagram showing the data processing system according to the example of the prior art.
Figure 2:
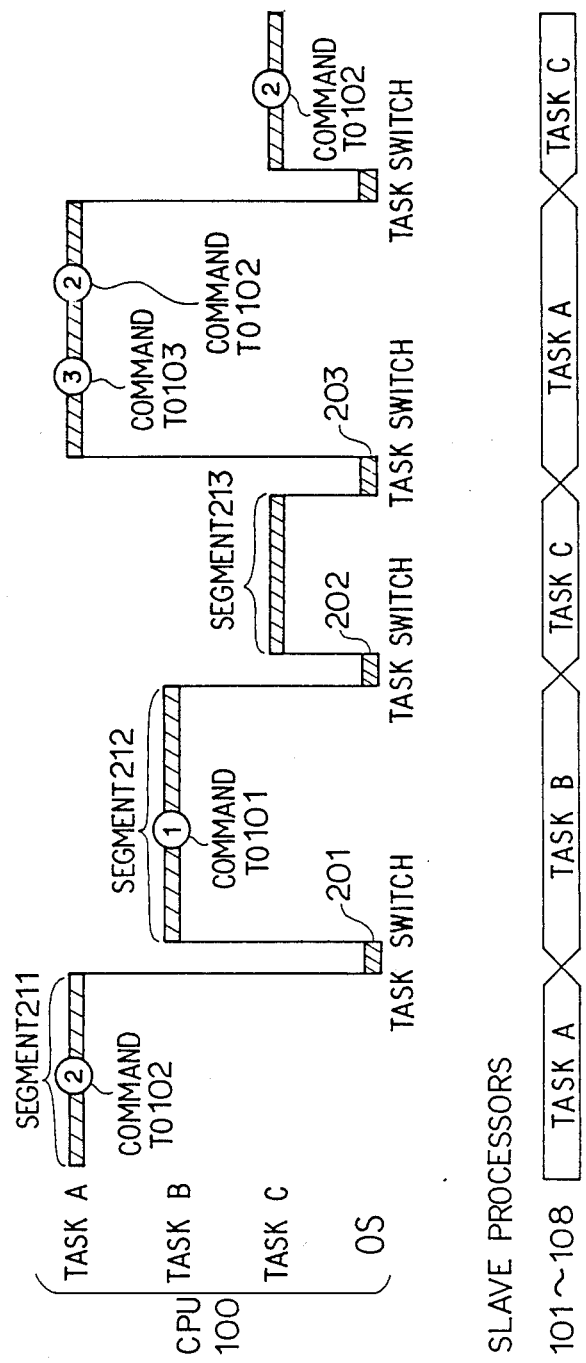
FIG. 2 is a diagram showing the status transition when the task switch and the command to the slave processor are executed in the example of the prior art.
Figure 5:
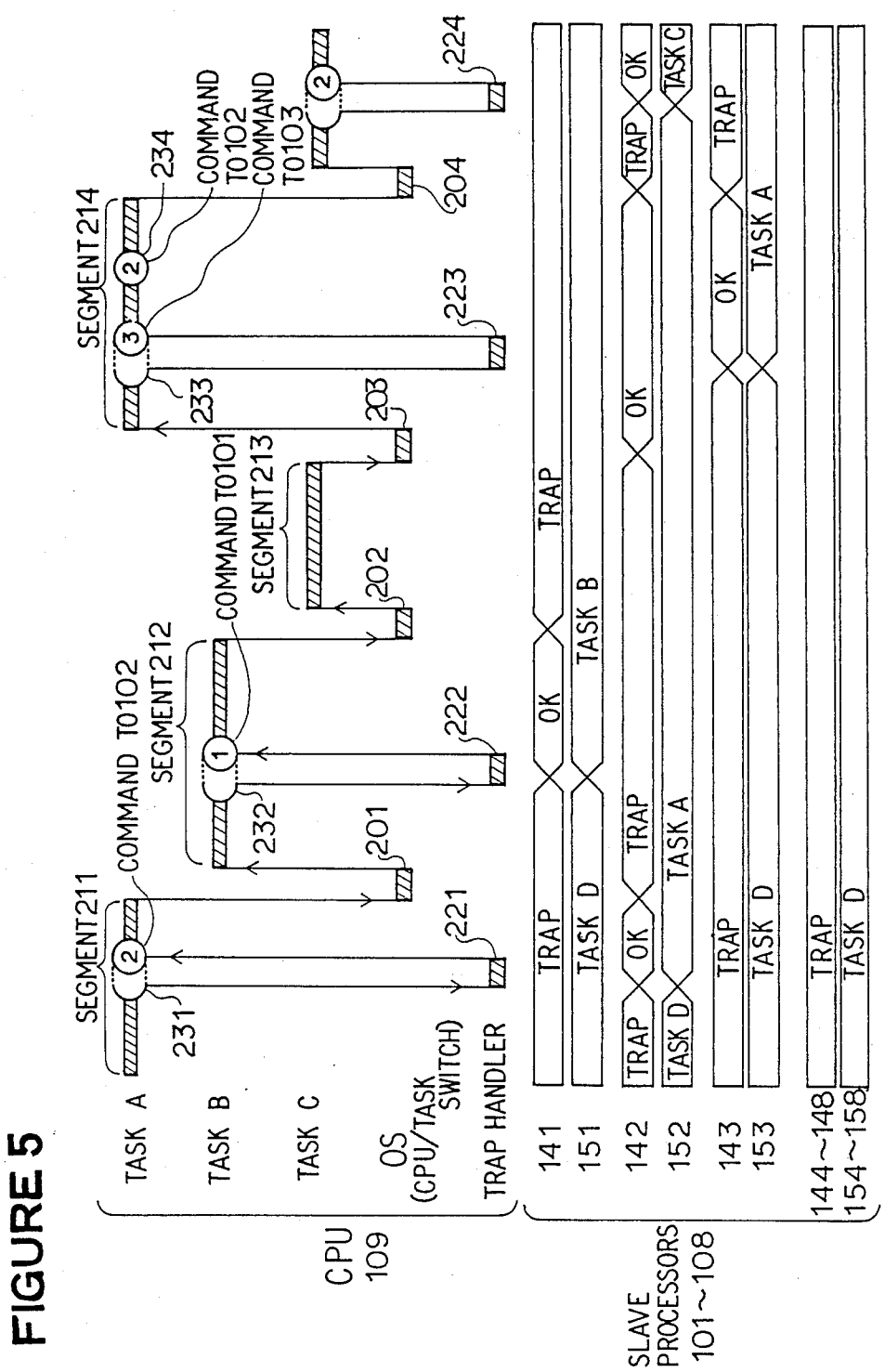
FIG. 5 is a diagram showing a status transition when a task switch and a command to a slave processor are executed in the embodiment of the present invention.

FIG. 5 shows the operations of the CPU 109 and the slave processors 101 to 108 in the same task switchings as those of FIG. 2. The slave processors 101 to 108 are initially set in the environment of a task D whereas the CPU is initially set in the environment of a task A so that the individual trigger ports 141 to 148 are at the "TRAP" content.

If the CPU 109 executes a command 231 to the slave processor 102, its control is shifted (at a step 221) to the trap handler because the trigger port 142 has the "TRAP" content. The task environment of the slave processor 102 is switched to the same task A as that of the CPU 109 so that the content of the owner register 152 becomes the descriptor of the task A whereas the trigger portion 142 takes the content "OK". After this, the interrupted command 231 to the slave processor 102 is re-executed.

In a task switching 201 of the CPU 109, the task environments of the slave processor 102 before and after the switching remain in the task A whereas the task environment of the CPU 109 immediately after the switching is switched to a task B so that the trigger port 142 takes the content "TRAP".

In a task switching 203 of the CPU 109, on the contrary, the task environments of the slave processor 102 before and after the switching remain in the task A whereas the task environment of the CPU 109 immediately after the switching returns to the task A so that the trigger port 142 takes the content "OK".

In response to a command 234 to the slave processor 102, the trigger port 142 takes the content "OK" so that the command 234 is executed without any TRAP (i.e., without any interchange of the task environments).

The embodiment thus far described realizes the most proper register saving/restoring processing at a unit of each slave processor. Despite of this realization, however, the register of each slave processor may be divided into plural blocks so that the register saving/restoring processing may be controlled at a unit of each block.

As has been described hereinbefore, in the data processing system constructed of a CPU and at least one slave processor, the register saving/restoring system according to the present invention has means for comparing the descriptor of the last task having used one slave processor most recently and the descriptor of a current task being executed by the CPU so that the register saving/restoring processing of the slave processor is not conducted when the CPU switches the task but if the tasks of the CPU and the slave processor are different while the slave processor is being used, thus bringing about an effect that the waste register saving/restoring processing of the slave processor need not be conducted.

In FIG. 3 showing the example of the operations of the present invention, all the waste register saving/restoring processings pointed out with reference to FIG. 2 showing the prior art example are obviated. In the example shown in FIG. 2, more specifically, the registers of the eight slave processors are saved and restored each time of the task switching so that totally 32 (4×8) register saving/restoring processings have to conducted. In the example of FIG. 5 according to the present invention, on the contrary, the register saving/restoring processing is conducted, if necessary, while the slave processor is being used so that the number of the register saving/restoring processings to be conducted can be as small as 4.

In the above mentioned embodiment, the microprocessor includes the eight slave processors, but the present invention is not limited to the eight slave processors. The microprocessor can comprises a plurality of slave processors of the number other than eight.

The invention has thus been shown and described with reference to specific embodiments. However, it should be noted that the invention is in no way limited to the details of the illustrated structures but changes and modifications may be made within the scope of the appended claims.

What is claimed is:

1. In a data processing system which comprises a central processing unit, at least one additional processing unit coupled to said CPU, each including at least one register, and a main memory unit coupled to both said CPU and said at least one additional processing unit having a register save area, a register saving/restoring system comprising:

first means coupled to said CPU for storing a descriptor of a task being executed by said central processing unit;

second means coupled to said at least one additional processing unit for storing a descriptor of a task to be executed by one of said additional processing units; and third means coupled to said at least one additional processing unit for judging whether or not contents of said first means and second means coincide, wherein said central processing unit transfers the execution of a command to each of said additional processing units by causing said third means to conduct the judgement such that, if said judgement reveals that the contents of said first means and second means do not coincide said CPU saves the content of the register of said at least one additional processing unit into the register save area of said main memory unit and restores the environment of a task indicated by said first means out of the register save area of said main memory unit into the register of another one of said additional processing nits before said CPU executes said command, and, if said judgement reveals that the contents of said first means and second means coincide, said CPU executes said command immediately without saving the register of said additional processing units.

2. A register saving/restoring system according to claim 1, wherein said first means is a task register.

3. A register saving/restoring system according to claim 2, wherein said second means is an owner register.

4. A register saving/restoring system according to claim 3, wherein said third means includes a comparator built in each of said additional processing units for comparing the contents of said first means and said second means.

5. A register saving/restoring system according to claim 4, wherein each of said additional processing units further includes:

a command port for receiving a command to be executed from said central processing unit and addressing same;

a trigger port for beginning the execution of a command addressed by said command port; and a check port for copying the content of said task register.

6. In a data processing system which comprises a central processing unit, at least one additional processing unit each including at least one register, and a main memory unit having a register save area, a register saving/restoring process comprising the steps of:

(i) storing a descriptor of a task being executed by said central processing unit;

(ii) storing a descriptor of a task to be executed by one of said additional processing units;

(iii) judging whether or not contents of said executed task and said task to be executed coincide;

(iv) if said judgement reveals that said contents do not coincide, saving the content of the register of each of said additional processing units into the register save area of said main memory unit, restoring the environment of said task to be executed out of the register save area of said main memory unit into the register of another one of said additional processing units, and transferring execution of a command to said corresponding additional processing unit; and (v) if said judgement reveals that said contents coincide, executing said command immediately without saving the register resources of said additional processing units.

* * * * *